UNITED STATES PATENT OFFICE.

JOSEE JOHNSON, OF NEW YORK, N. Y., ASSIGNOR TO JOSEPH DITTO & CO., OF SAME PLACE.

IMPROVEMENT IN COMPOSITIONS FOR ROOFING.

Specification forming part of Letters Patent No. 21,927, dated October 26, 1858.

*To all whom it may concern:*

Be it known that I, JOSEE JOHNSON, of the city, county, and State of New York, have discovered certain new and useful uses for Mica in Roofing and Covering Walls; and I do hereby declare that the following is a full and exact description thereof, reference being had to the accompanying specimens.

The nature of my discovery consists in the use of mica for roofing and covering walls.

To enable others skilled in the art to make and use my discovery, I will describe its construction and operation.

I prepare the mica by first reducing it to a suitable size.

In using mica for roofing and covering the sides of buildings and boat-decks I use the mica reduced to a suitable size with any suitable glutinous water-proof material—as coal-tar, gas-tar, oil, paint, &c.—the composition being of such a consistency as to be easily spread with a stiff brush, and forming a covering to the roof, &c. The mica is then spread in layers on this tar, paint, or other material, from the hand or otherwise, so that by repeated coats this flat, thin material will form, in connection with those other substances, a strong elastic fire and water proof material.

The mica, being transparent and reflective, will act as a reflector of the sun's rays and add greatly to the coolness of the building to which it is applied.

The flat character of the mica, in its application to the glutinous or resinous material, will receive several thicknesses, lapping one over the other, and thus, by repeated applications of it on the various coats, it forms a coating strong and flexible and perfectly impervious to water, and at the same time protecting the paint or other material from exposure to the atmosphere, which has a tendency to reduce its durability.

It will be seen that when I have put on one, two, or more coats of the mica the roof or wall is perfectly hard and water-tight. The mica, being a perfect resistant of heat, cannot be melted or destroyed by the most intense heat; consequently the roof or glutinous material, being completely covered by the mica, becomes fire proof against any ordinary exposure to fire, and will not be affected by the burning of any light substance.

Having thus described my invention or discovery, what I claim as new, and desire to secure by Letters Patent, is—

The use of mica for roofing, covering the sides of buildings and boat-decks, as herein set forth and described.

JOSEE JOHNSON.

Witnesses:
   T. G. CLAYTON,
   J. C. CLAYTON.